United States Patent [19]

Britz

[11] 4,099,879
[45] Jul. 11, 1978

[54] OPTICAL ANTENNA OR LENS

[76] Inventor: Hans Ernst Britz, Ludwig-Quidde-Str. 23, 6000 Frankfurt am Main 56, Fed. Rep. of Germany

[21] Appl. No.: 651,809

[22] Filed: Jan. 23, 1976

Related U.S. Application Data

[63] Continuation-in-part of Ser. No. 447,814, Mar. 4, 1974, Pat. No. 3,953,131.

[30] Foreign Application Priority Data

Jan. 24, 1975 [DE] Fed. Rep. of Germany ....... 2360781

[51] Int. Cl.² .................. G01B 11/26; G02B 27/00
[52] U.S. Cl. ............................ 356/141; 350/32; 350/167; 350/179; 350/213; 356/152
[58] Field of Search ................ 356/141, 152; 343/100 SA, 115; 350/32, 22, 179, 167, 213; 250/227

[56] References Cited

U.S. PATENT DOCUMENTS

| 1,549,579 | 8/1925 | Lenouvel | 350/213 |
|---|---|---|---|
| 2,326,970 | 8/1943 | Rantsch | 350/167 |
| 3,090,831 | 5/1963 | Schepler | 350/213 |
| 3,263,088 | 7/1966 | Goldfischer | 350/167 |
| 3,299,203 | 1/1967 | Gibaja | 350/167 |
| 3,329,818 | 7/1967 | Woehl | 250/227 |
| 3,629,592 | 12/1971 | Courrier | 350/32 |
| 3,691,483 | 9/1972 | Klein | 332/7.51 |
| 3,757,333 | 9/1973 | Procopio | 343/100 SA |
| 3,860,811 | 1/1975 | Slauter | 350/179 |

FOREIGN PATENT DOCUMENTS 1,273,835  7/1968  Fed. Rep. of Germany ....... 350/175 SL Primary Examiner—S. C. Buczinski
Attorney, Agent, or Firm—Craig & Antonelli

[57] ABSTRACT

An opto-electronic antenna system includes a plurality of transmitting/receiving antennas disposed over a prescribed geometrical surface such as a sphere. To the antennas are optically coupled transmitter/receiver units such as photo-detectors or laser transmitters. The antenna units are scanned electronically according to their position on the geometrical surface by supplying to the individual units, signals differing in phase in accordance with the position of the antenna with which the units are associated both in the vertical and horizontal directions. An evaluation circuit is associated with each unit for determining the azimuth and elevation directions of received radiation. The antennas are constructed of a multitude of lenses having a hexagonal shape.

16 Claims, 20 Drawing Figures

① RECEPTION RADIATION = 0 (TOTAL REFLECTION)

② RECEPTION RADIATION MAXIMUM (WHEN $\phi_E = 45°$)

APERTURE  PRIOR ART

OPTICAL ANTENNAS

HOLLOW SPACES

LOW STABILITY

BUBBLE DEFORMATION LINE

FRONT VIEW

NO HOLLOW SPACES

STABILITY HIGH f. ELEVAT. 45°
$F_I{}^{0123} = F_{II}{}^{4567}$

FIG.15
VERTICAL PLANES
IN ELEVATION
n = 12
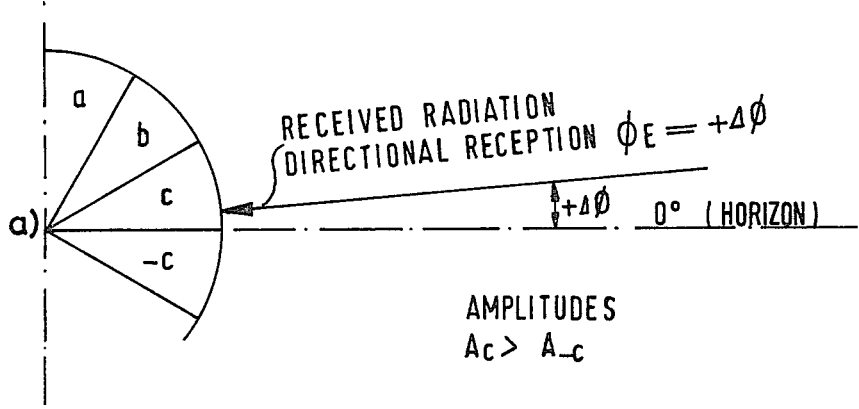
a) RECEIVED RADIATION
DIRECTIONAL RECEPTION $\phi_E = +\Delta\phi$
0° (HORIZON)
AMPLITUDES
$A_c > A_{-c}$
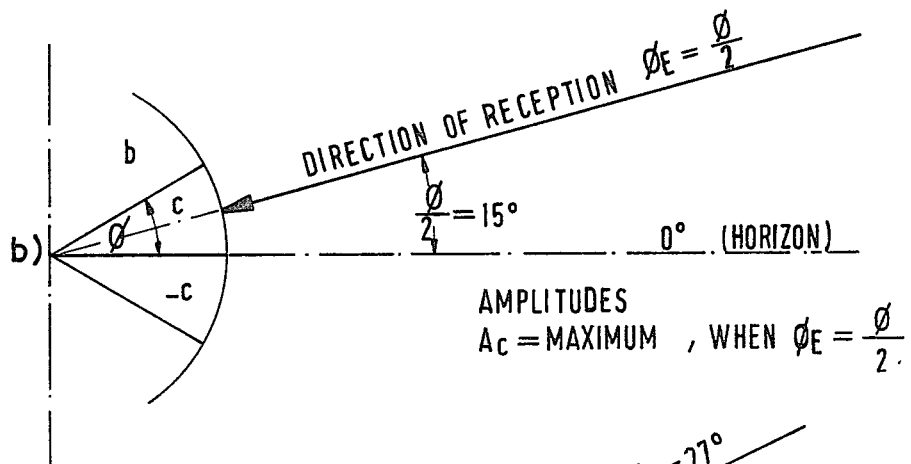
b) DIRECTION OF RECEPTION $\phi_E = \frac{\phi}{2}$
$\frac{\phi}{2} = 15°$
0° (HORIZON)
AMPLITUDES
$A_c = $ MAXIMUM, WHEN $\phi_E = \frac{\phi}{2}$
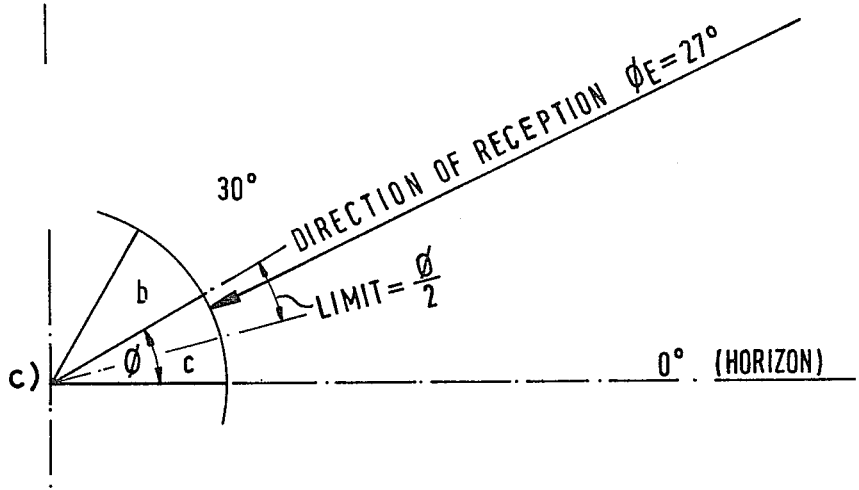
c) DIRECTION OF RECEPTION $\phi_E = 27°$
LIMIT $= \frac{\phi}{2}$
0° (HORIZON)

OPTICAL ANTENNA OR LENS

CROSS REFERENCE TO RELATED APPLICATION

This is a continuation-in-part of U.S. application Ser. No. 447,814, filed Mar. 4, 1974, now Pat. No. 3,953,131, the subject matter of which is incorporated by reference herein.

BACKGROUND OF THE INVENTION

1. Field of the Invention

The present invention relates to an opto-electronic antenna system for use in pulse measuring technology, continuous measuring technology, and communications technology in space, the atmosphere, water, and on the ground and is especially useful in aeronautics and astronautics.

2. Description of the Prior Art

Directional antennas have been employed for wireless communications (at high frequencies) and for measurements in the field of radio-technology. Such directional antennas can be fixedly arranged (for use in connection with directional radio) or rotatably mounted (for radar applications). Moreover, of late, laser technology, which is presently undergoing substantial development, has employed the use of various types of optical antennas.

However, in the present state of the art, three-dimensional space scanning techniques have not yet been satisfactorily mastered in radar technology, since for one thing, the scanning velocity is quite low, and it is very difficult to increase the same, due to the rotation of the antennas and the pulse time delay involved. For an explanation of radar technology, attention may be directed to the periodical entitled (VDI Nachrichten" (German Engineer's Association News) No. 48, 1972, particularly the chapter entitled "Complicated Third Dimension" Radar Symposium in Ulm.

In the field of laser technology, extremely high standards must be satisfied with respect to the positional stability of both the transmitting and the receiving antennas and the practical usefulness is, accordingly, limited. For an explanation of laser technology in this respect, attention is directed to the publication entitled "Lasers", by Klaus Tradowsky, Vogel Publishers, p. 127, as well as the periodical entitled "Rundfunktechnische Mitteilungen" (Radio Communication News) Vol. 16, No. 6, p. 291, 1972.

OBJECTS OF THE INVENTION

In light of the problems relating to the prior art, the present invention has been developed and makes it possible to effect a very rapid three-dimensional, space scanning operation by means of a stationary, non-rotatable, opto-electronic antenna system which employs laser beams.

Furthermore, in connection with such a system, the present invention makes use of a process involving the spatial direction finding of laser beams and beams having similar propagation characteristics, reflected pulses, foreign pulses, as well as pulse sequences of transponders with the aid of an electronic evaluation circuit.

BRIEF SUMMARY OF THE INVENTION

In accordance with the present invention, optical or optoelectronic antennas, having solid angles with respect to one another, are arranged so that a spherical-type characteristic is produced, formed by the apertures of the antennas (optical).

The opto-electronic antenna system is sub-divided along longitudinal and latitudinal lines, and the optical or opto-electronic antennas are disposed at the points of the intersections of these longitudinal and latitudinal lines. The fineness of the subdivisions depends upon the accuracy requirements which the opto-electronic system must meet.

Moreover, the outputs of all of the optical and/or optoelectronic antennas, which are arranged within a solid angle component of $\phi$ degrees in the horizontal and vertical directions, are correlated with a common receiver.

These antenna outputs are modulated and shifted in phase with respect to one another, so that each solid angle component is associated with a specific phase position for purposes of identification. The resultant phase position is formed in accordance with magnitude and direction by a subsequent amplitude selection, according to the magnitude and phase and a subsequent electronic addition of two adjacent, selected, solid angle components. As a result, it is possible to determine, in a simple electronic manner, even without the use of a transponder, the solid angle, by means of an individual and, moreover, fixedly disposed antenna arrangement.

The opto-electronic antenna system, can, moreover, be spherical or similar to a sphere in shape, or it can consist of fragments of such shapes, or it may be composed of a plurality of such fragments. The individual optical and/or opto-electronic antennas can have, for each latitude (or portion thereof) different or additional antenna aperture diameters. In this regard, conventional optical antenna configurations may be employed.

As a result of the present invention, it is possible to attain a higher space scanning velocity than in the case of radar and, moreover, as was mentioned previously, since the antennas are fixed, the use of moving parts is avoided. Also, since a large number of lasers may be available for space scanning, the pulse efficiency of the lasers can be increased.

Moreover, measuring both distance and altitude can be effected simultaneously through one arrangement and, at the same time, through a cyclical scanning operation, a total pulse sequence can be obtained which surpasses the pulse sequence afforded by an individual laser.

This invention relates to three methods used to determine the elevation and azimuth angles and the electronic evaluation circuitry used to perform these methods.

This invention also relates to a spherical optical antenna configuration formed from many hexagonal shaped lenses.

BRIEF DESCRIPTION OF THE DRAWINGS

FIGS. 4 and 4a present the block diagrams of an evaluation scheme according to the first evaluation method.

FIGS. 9, 9a and 11 through 13 depict the antenna beam-vector patterns for explaining an embodiment of the invention.

FIG. 15 represents the vertical elevation planes for various input signals.

DESCRIPTION OF THE PREFERRED EMBODIMENTS

For clarity, the following is a list of symbols used in the description.

$\phi^2$ — Solid angle — partial segment (square angle)

I — Solid angle plane between 90° and 45° Elevation ($n = 8$)

II — Solid angle phase between 45° and 0° Elevation ($n = 8$)

−II — Solid angle plane between 0° and −45° Elevation ($n = 8$)

$a$ — Solid angle plane between 90° and 60° Elevation ($n = 12$)

$b$ — Solid angle plane between 60° and 30° Elevation ($n = 12$)

$c$ — Solid angle plane between 30° and 0° Elevation ($n = 12$)

$f$ — Irradiated (transmissive) solid angle component within a beam of a diameter $D_L$ $D_L$ — The diameter of a beam at the limit of which the transmissive intensity of the spherical surface reaches the value zero.

$f_{DL}$ — Sum of all surface parts within a solid angle plane which are limited by $D_L$.

F — Corresponds to $f_{DL}$ related to a certain solid angle plane, (e.g. I, or II, or −II, or $a$, or $b$, etc.).

$M_P$ — Center of a sphere or a hemisphere $\phi_E$ — Vertical angle (Elevation)

$\phi_A$ — Horizontal angle (Azimuth)

ADC — Digitizer

S+H — Sample & Hold-circuit

OEA — Opto-electronic antenna system $\phi_1$ — Angle calculated from the cosine quotient < 30°

$\phi_2$ — Angle calculated from the sine quotient > 60°

$100_3$ — Angle calculated from the sine quotient < 60°

$\phi_4$ — Angle calculated from the cosine quotient > 60°

$\Delta\phi'$ — Angular deviation of $\frac{1}{2} \phi$ degree (in azimuth)

$\Delta\phi$ — Angle < $\phi$ (in azimuth)

$ao$ — Aperture diameter of an optical antenna (lens)

Figure 9:
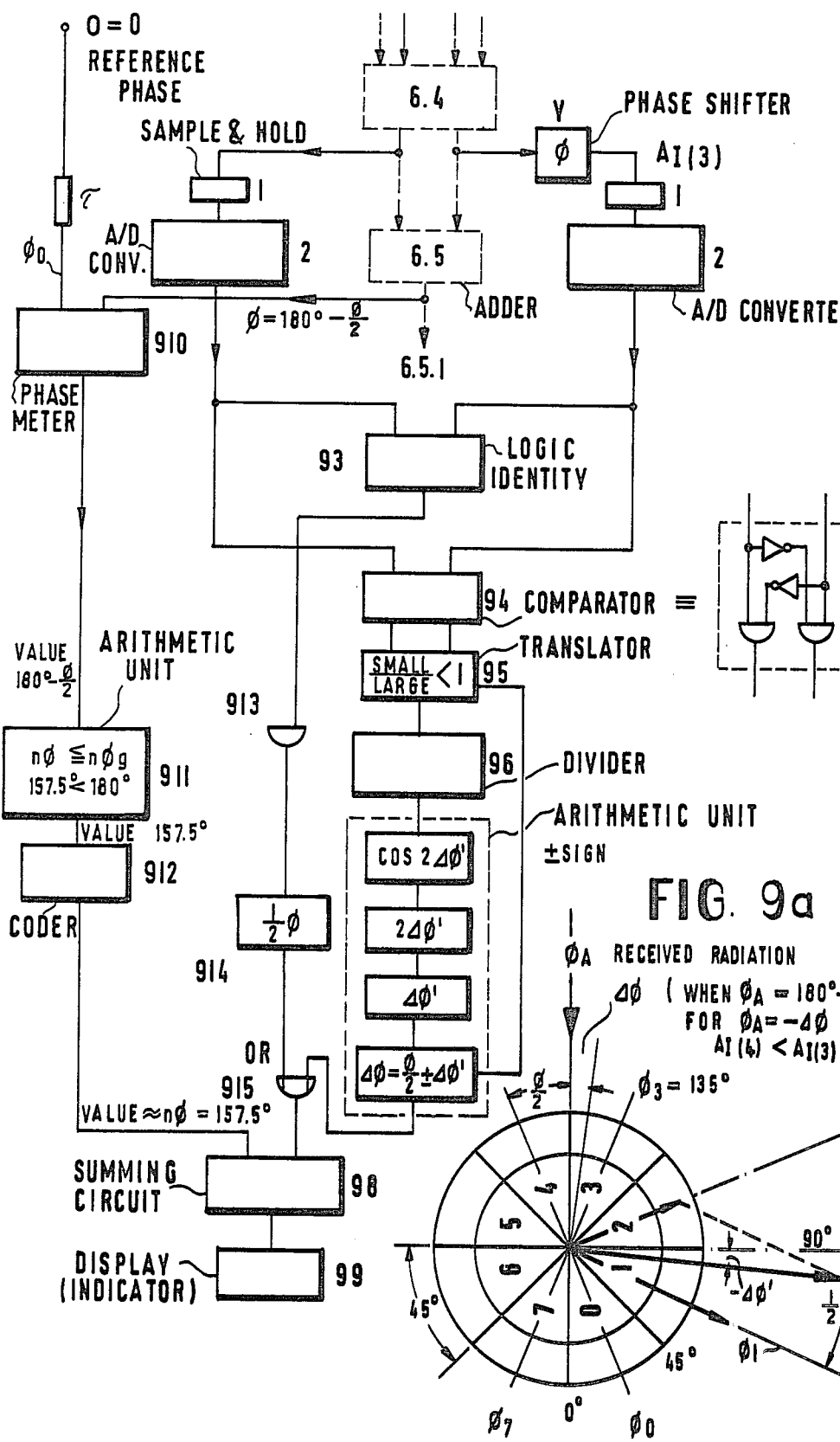
FIG. 9 depicts a block diagram of an evaluation scheme according to the third evaluation method.

$100 g$ — Measurement of angles in the phasemeter 910 (FIG. 9)

$n = 360°/\phi$

The following description states the spherical associative characteristics used as a basis for the evaluation methods of the invention.

If a spherical surface of a given figure (FIG. 1 and FIG. 2) is subdivided in its horizontal and vertical planes into $n$ equal square angles of $\phi^2$, then its subdivision planes I and II or II and −II respectively limit spherical surface components of certain magnitudes.

A beam of a diameter $D_L$, the lengthened optical axis of which crosses the center $M_p$, irradiates, under the vertical angle $\phi_E = 0°$ in the planes II and −II, surface components of the same magnitude.

Therefore: $F_{II} = f_{D_L} = F_{-II} = f_{D_L}$ with $f_{D_L} = f_4 + f_5 + f_6 + f_7$ where $F_I$, $F_{II}$, and $f_{D_L}$ represent surface areas enclosed within solid angle planes within $D_L$.

If the vertical angle $\phi_E$ is increased from 0° to 45°, then the irradiated spherical surface component of $F_I$, $f_{D_L}$, with its $f_{DL} = f_0 + f_1 + f_2 + f_3$, is smaller than that of $F_{II}$ by the factor 0.7071.

In this connection:

$$\text{For } \phi_E = 0° \quad \frac{F_{II}}{F_{-II}} = 1 = \cos 0°$$

$$\text{For } \phi_E = 45° \quad \frac{F_I}{F_{II}} = 0.7071 = \cos 45°$$

These associative characteristics apply in the same way to all values of $n \to \infty$ and their vertical angles $\phi_E$ and to any square angle components of "$n$" components between the neighboring solid angle respectively, in which cases the quotient ($F_I/F_{II}$, for example) shall always be $\leq 1$.

For $n = 12$:

$$\text{For } \phi_E = 30° \quad \frac{F_b}{F_c} = \frac{f_{D_L b}}{f_{D_L c}} = 0.866 = \cos 30°$$

$$\text{For } \phi_E = 60° \quad \frac{F_a}{F_b} = \frac{f_{D_L a}}{f_{D_L b}} = 0.5 = \cos 60°$$

In practice, $D_L$ is dependent on the construction of the optical antennas and on the refractive index of the material (e.g. glass).

Figure 1:
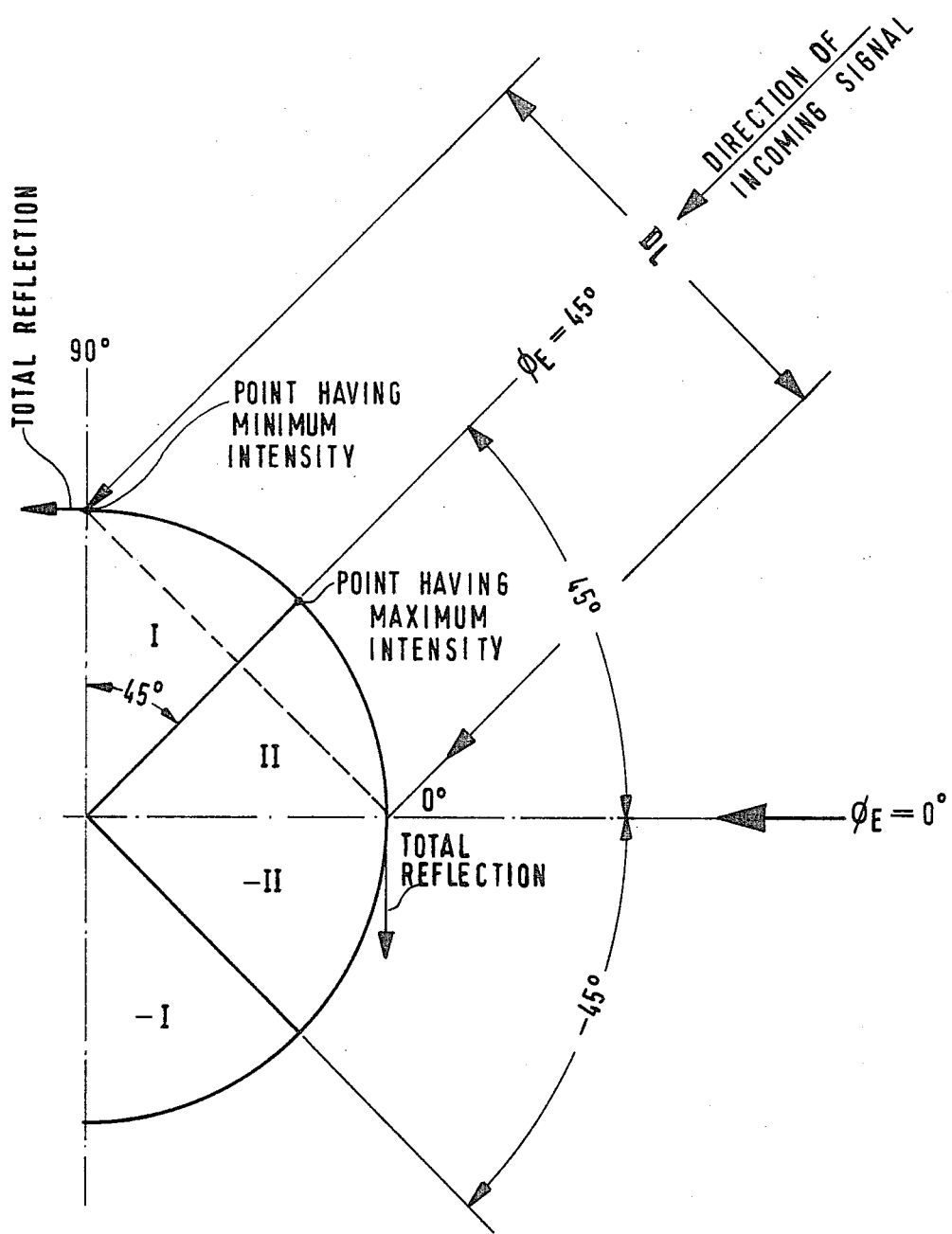
FIG. 1 depicts the side view of the opto-electronic system in accordance with the present invention for the vertical incoming direction of $\phi_E = 45°$ or alternatively for $\phi_E = 0°$ when $\phi = 45°$ and $n = 8$.
Figure 2:
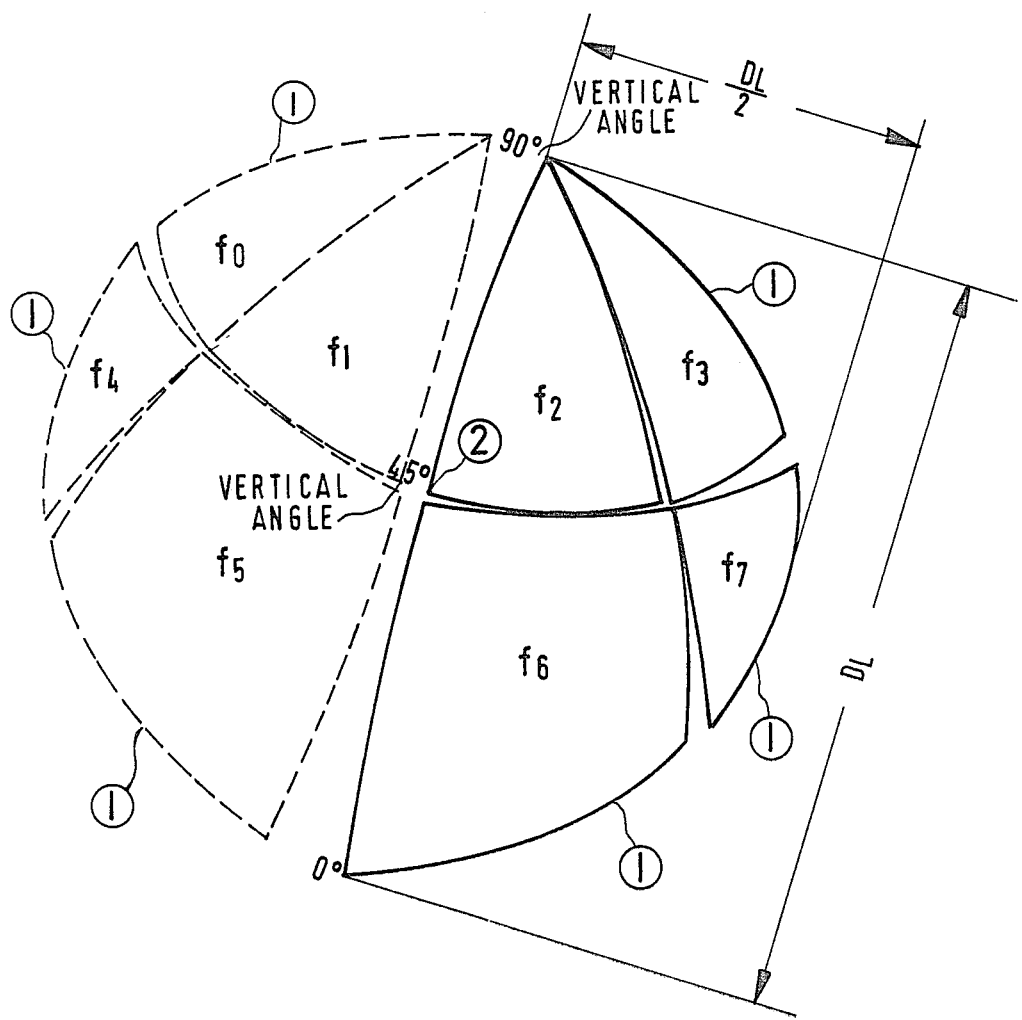
FIG. 2 depicts one-half of the front view of the development of the spherical surface which is irradiated under $\phi_E = 45°$ in the vertical direction.

As a rule, $D_L$ is smaller than assumed in FIGS. 1 and 2. $D_L$ is not constant, but the quotient as the relationship of two neighboring planes is not dependent on the size of the diameter $D_L$.

$D_L$ does not extend beyond the vertical central axis or does not exceed the minimum operating level of the complementary amplitudes of the areas.

EVALUATION CIRCUIT BY VECTOR ADDITION USED FOR THE DETERMINATION OF $\phi_E$

Method 1

Figure 11:
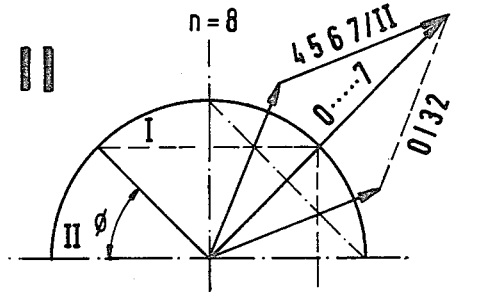

If $\phi_E$ is determined by vector addition according to FIG. 11, then, owing to the described spherical associative characteristics, a more or less large deviation takes place if $n < 16$ is selected.

Figure 3:
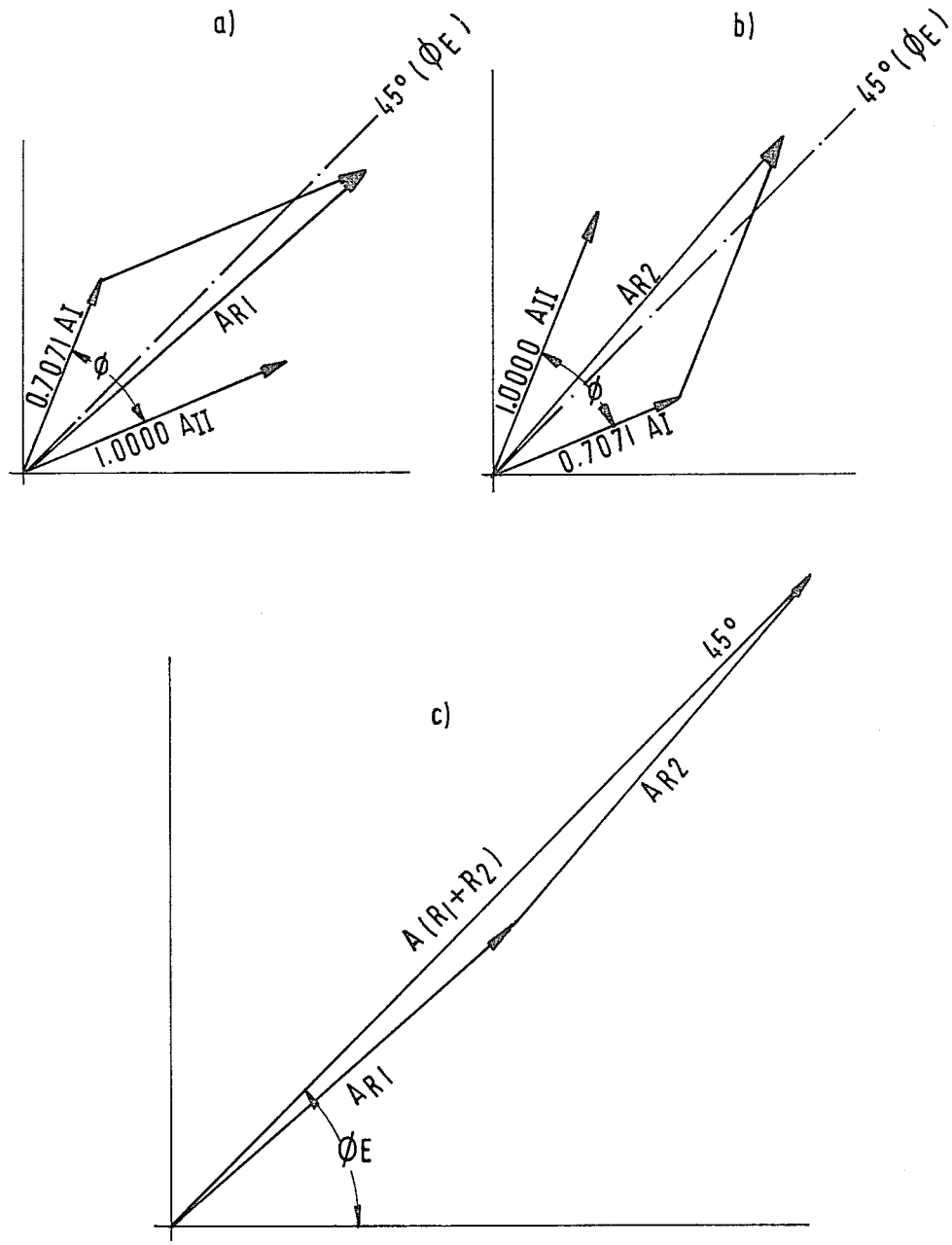
FIG. 3 depicts the vector representations of the first evaluation method.
Figure 12:
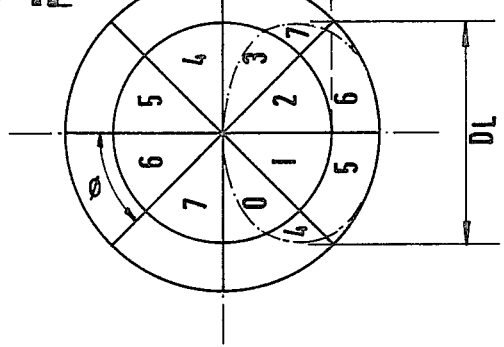
Figure 13:
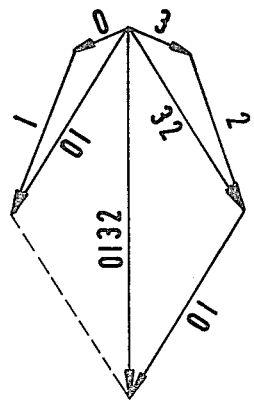

In an example with $n = 8$ (FIGS. 11 - 13), amplitudes of different degrees for $\phi_E = 45°$ are obtained at the vector addition in the plane I and plane II (measurable on the input of the vertical phase shifter). The amplitude I is smaller by the factor 0.7071 than the amplitude II (FIG. 3a).

The factor $$0.7071 = \frac{1\sqrt{2}}{2} = \frac{1}{\sqrt{2}}$$

is a particular identification in trigonometry and also represents for an analogous comparison the 3-dB-value of the amplitude frequency of an RC amplifier (1 dB = 0.115 Neper).

In the case of the vector addition under $\phi_E = 45°$ the amplitudes I and II must be of equal size. The Amplitude I = Amplitude II if the attenuation of the vertical phase shifter is 3 dB. The deviations of $\phi_E = 45°$, however, become inaccurate.

When a beam or pulse is received in a vertical direction under 45°, then to correspond to the various sized surfaces in the planes I and II, (see FIGS. 1 and 2), various sized amplitudes are gained.

This invention utilizes the spherical associative characteristics associated with the various divisions of the spherical surface in its evaluation methods.

For $\phi_E = 45°$ and $n = 8$:

$$\frac{\text{Area } F_I}{\text{Area } F_{II}} = \frac{0.707}{1.000} = \frac{\text{Amplitude } A_I}{\text{Amplitude } A_{II}} = 0.707 = \cos 45°$$

For $\phi_E = 0°$ and $n = 8$:

$$\frac{\text{Area } F_{II}}{\text{Area } F_{-II}} = \frac{1.000}{1.000} = \frac{\text{Amplitude } A_{II}}{\text{Amplitude } A_{-II}} = 1.000 = \cos 0°$$

Figure 4:
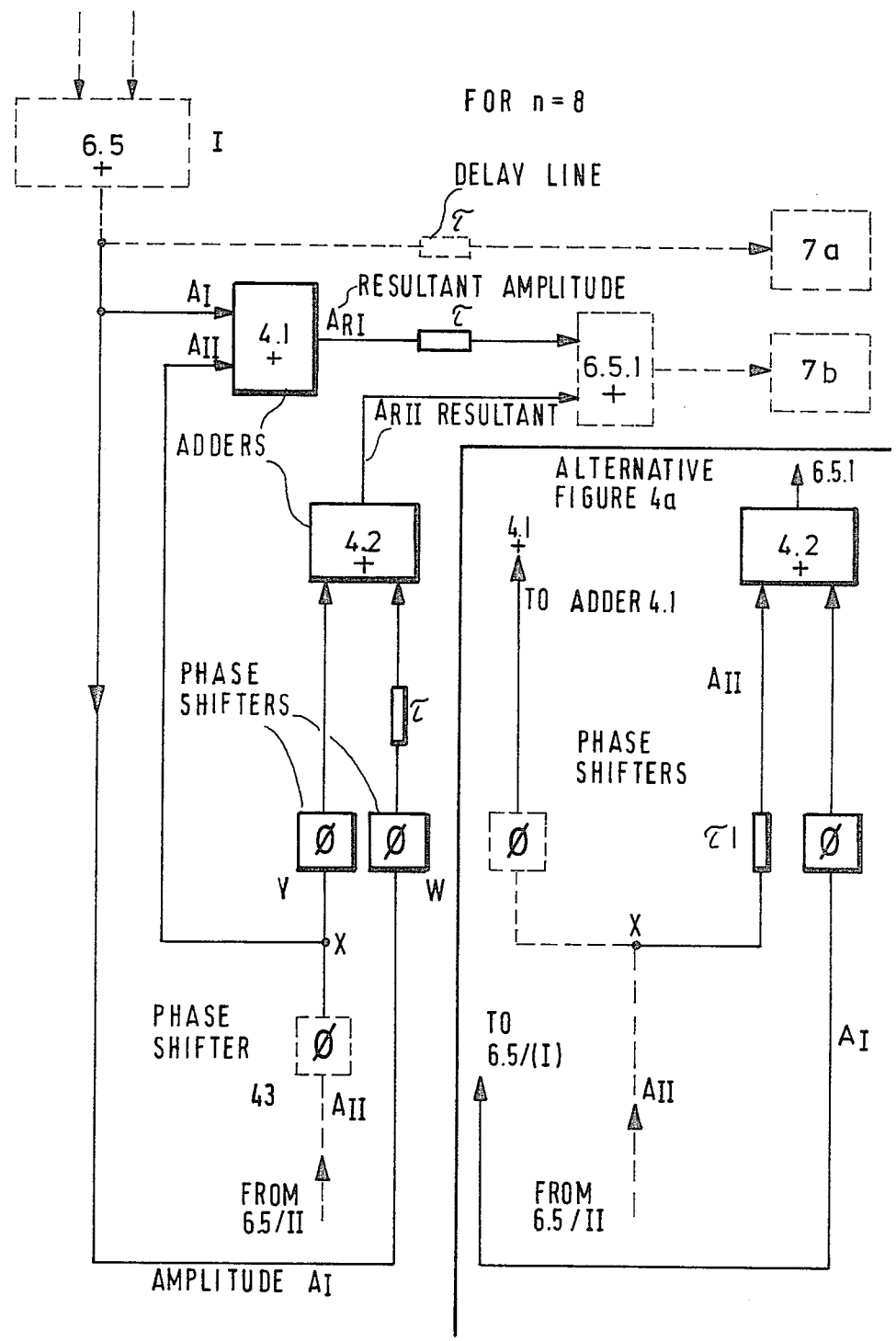

An accurate evaluation circuit is illustrated in FIG. 4. The prerequisites are met by a phase change of the two amplitudes $A_I$ and $A_{II}$ or $AR_I$ and $AR_{II}$ respectively (FIG. 3b) before these amplitudes are added up vectorially (FIG. 3c).

Two summing circuits 41 and 42 shown in FIG. 4 as well as one or two phase shifters Y are necessary to perform this function.

Figure 14:
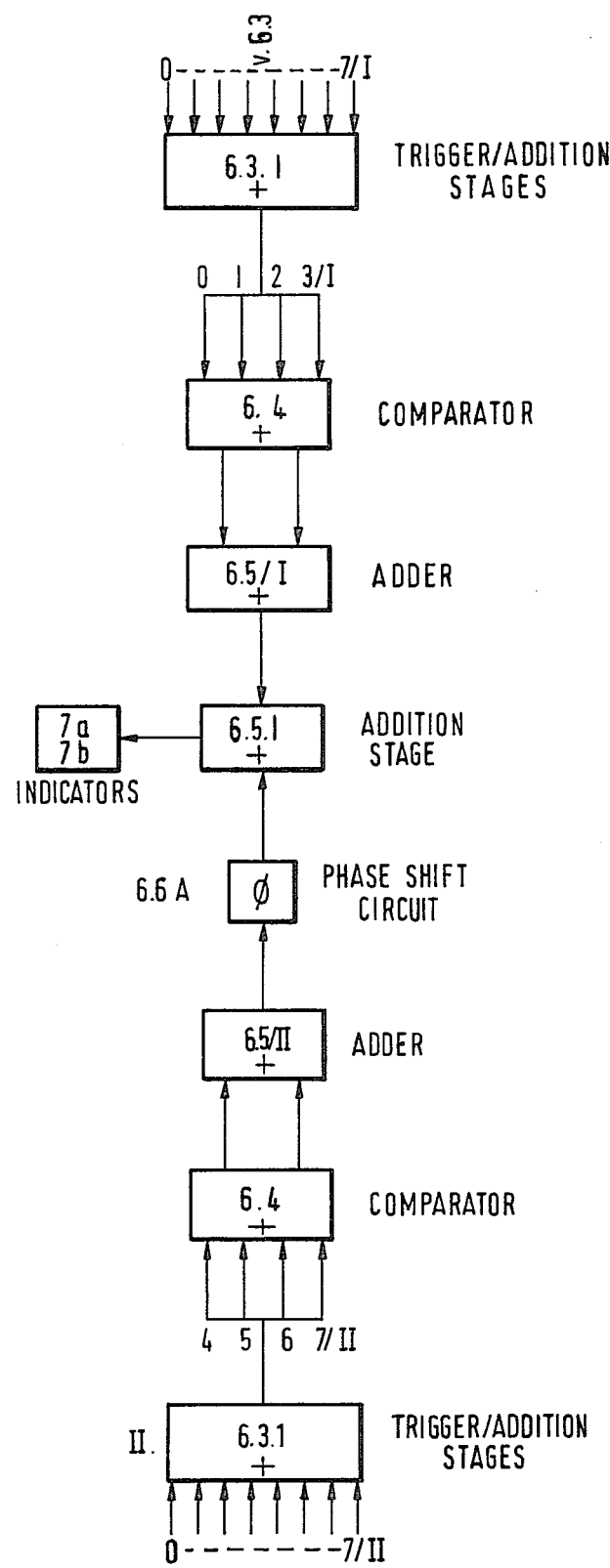
FIG. 14 represents a portion of the electronic evaluation circuitry, used for processing a plurality of adjacent azimuth inputs for respective elevational antenna directions.

The output of the already existing phase shifter shown in FIG. 14 is connected to the phase shifter Y in the feed line to the vertical summing circuit 42 shown in FIG. 4.

The component $A_I$ is similarly run via a phase shifter 3 before the common summing circuit 42. In other words, the circuit for the vertical plane I is connected to the addition stage via the phase shifter for amplitude $A_I$ and the signals $A_I$ and $A_{II}$ are jointly added in addition stage 2.

ALTERNATIVE: (FIG. 4a)

If the branch point x is located before the phase shifter that is already in existence 43', the second phase shifter can be dispensed with.

In both cases, the time delay must be matched by means of delay lines $\tau$ and the amplitude proportion ($A_I$ to $A_{II}$ or $A_{R1}$ to $A_{R2}$) are also held constant.

This means that a circuit alternatively pursuant to FIG. 4a must be adjusted so that (1.) the time delay $\tau$ for the abolished 3rd phase shifter W which is replaced by the time delay of the delay line $\tau_1$ and (2.) by adjustment, amplitudes $A_I$ and $A_{II}$ have the same value at all inputs of the addition stages 41 as at stage 42. The amplitude $A_I$ at the input of stage 1 must not be unequal to the amplitude $A_I$ at stage 2. The same applies to amplitude $A_{II}$.

As a rule, all phase shifters include an amplifier so that adjustment is possible.

All units drawn with dashed lines in FIG. 4 are already included in FIG. 14.

The circuit pursuant to FIG. 4 can be used for:
(1.) the comparator circuit 6.4 shown in FIG. 14.
(2.) the summing circuits instead of comparators 6.4 in FIG. 14.
(3.) a monopulse system.

A pure summing circuit 6.4 provides sufficiently great accuracy when $n \geq 12$ is selected.

This applies only to vertical evaluation: the greater "n" that is selected, the smaller the error angle becomes.

For example:

(1) At $\phi_E = 45°$ and $\phi = 45°$, the resultant can only be formed from two planes in the vertical direction, i. e. I and II, or from the amplitudes $A_I$ and $A_{II}$, because $n = 8$.

At $\phi_E = 45°$, it is the amplitude component $A_{II} = 1$ and the component $A_I = 0.707$.

(2) At $n = 12$, there are 3 planes at 90° elevation, namely a, b and c.

For $\phi_E = 30°$ and $\phi = 30°$, the component is $A_c = 1$ and $A_b = 0.866$.

In cases 1 and 2, the amplitudes would have to be of the same size if indication is to be accurate:
$A_I = A_{II}$
$A_c = A_b$ The difference at $n = 12$ is $1.000 - 0.866 = 0.134$ This inequality only exists in the vertical planes or stages.

In practice, the amplitude $A_b$ can be increased from 0.866 to 1.000 by appropriate amplification (adjustment), so that a circuit as per FIG. 4 or 4a is superfluous.

In principle, this can also be done at $n = 8$. Only here the amplitude difference is greater (1.000 − 0.707 = 0.293).

Figure 5:
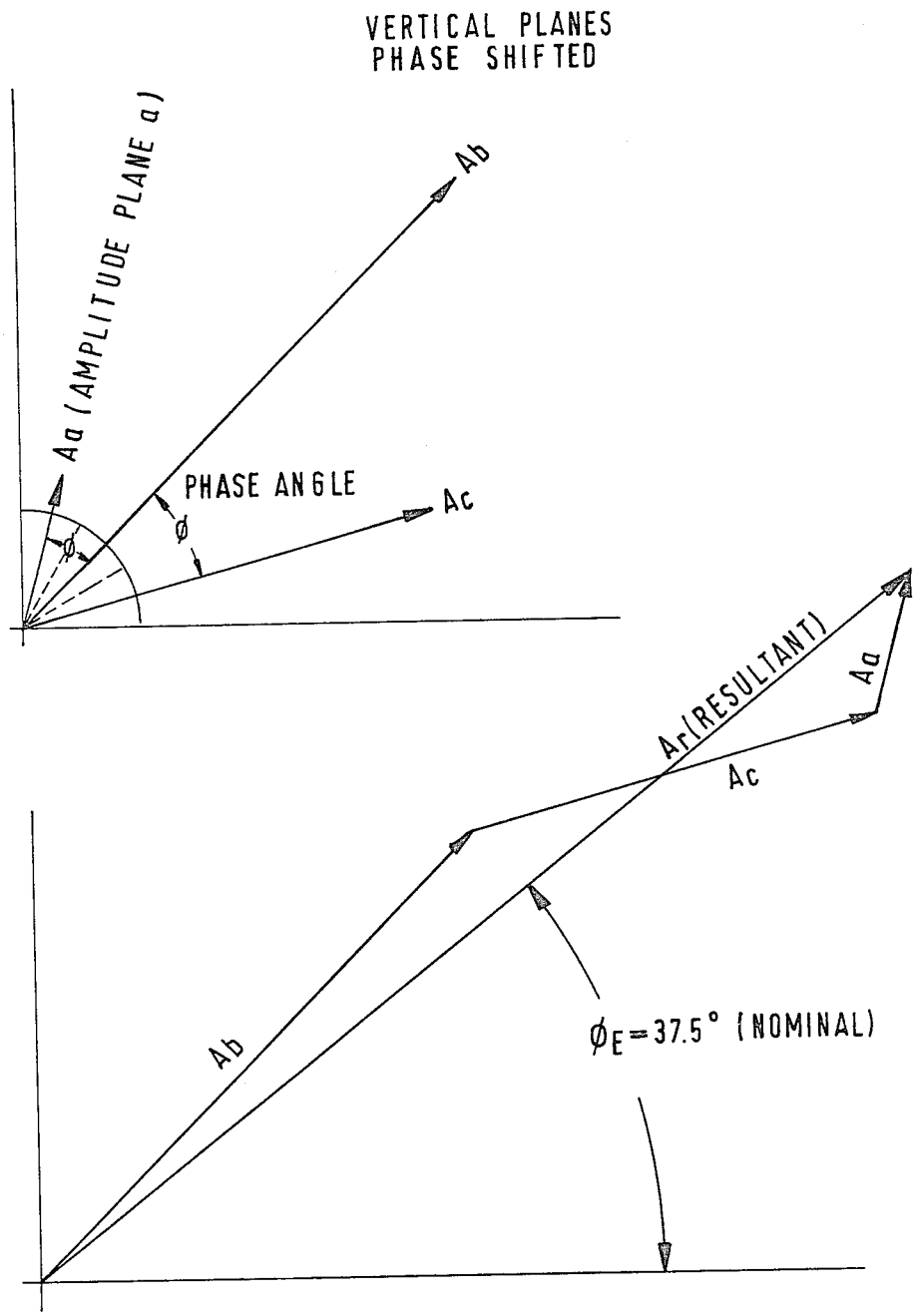
FIG. 5 represents the vector diagram formed from the amplitude components $A_a$, $A_b$, and $A_c$ when, using the first evaluation method and adjusting the amplification factors, the direction of the received beam is exactly at $\phi_E = 37.5°$.

FIG. 5 represents the vector diagram, formed from the amplitude components $A_c$, $A_b$ and $A_a$, when, by the method shown above (and/or with the aid of the circuit FIG. 4 or 4a) by varying the amplification factors, the direction of the received beam is shown exactly at $\phi_E = 37.5°$.

An adjustment of amplitudes is necessary if no circuit pursuant to FIG. 4 or 4a is used.

The phase change as per FIG. 4 is then not necessary if said accuracy is sufficient.

Method 2

Determination of $\phi_E$ by division.

Advantage: Very great accuracy possible in the calculation of $\phi_E$.

Figure 7:
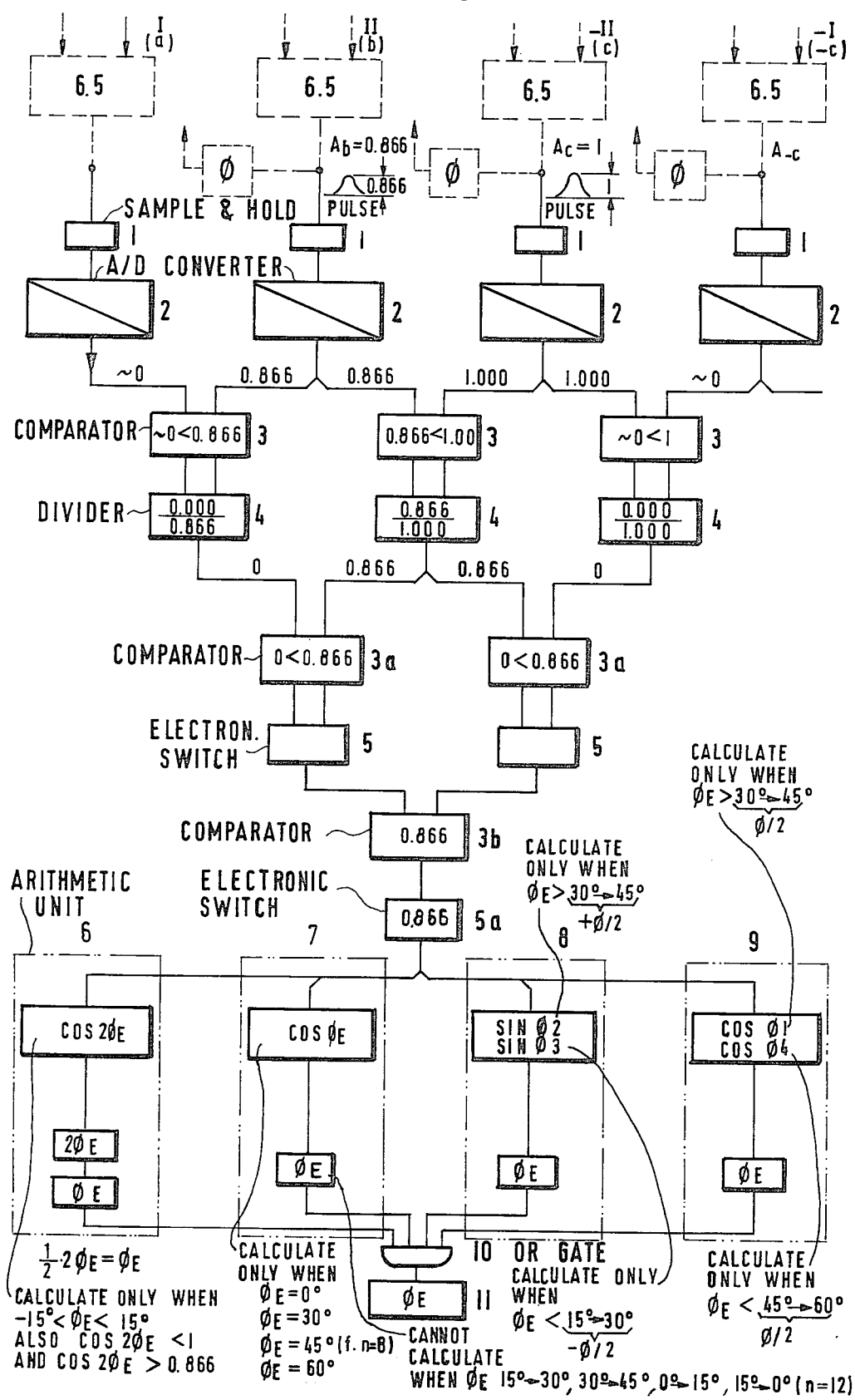
FIG. 7 depicts a detailed block diagram of the evaluation system according to the second evaluation method.

For this type of determination of $\phi_E$, vertical phase shifters cannot be used; they are electrically by-passed in the system shown in FIG. 7.

The outputs of the summing circuits 6.4 of FIG. 14 are connected to the inputs of the S+H circuits 1 of ADC 2 (FIG. 7).

Series connection of the S+H circuits is required to enable a stable code to be achieved at the output of ADC 2 during conversion time Tu.

Conversion times totalling 8 ns have already been realized, as shown in the following disposition:
(For a parallel ADC with 4-bit analysis)
-Dead time of the digital S+H circuit: 3.5 ns
-Time delay over the conducting paths: 2.0 ns
-Total dead time of decoder network: 2.5 ns Shortening of this conversion time Tu is possible by employing "Medium Scale Integration" (see the technical journal "Der Elektroniker" No. 2 Page EL 1 - 7, 1974 volume, publication by Dr. Roland Best).

The electronic ADC 2 work in accordance with the comparison method, i. e. the unknown analog input quantity is compared with a second analog quantity of which the digital value is known.

Said second analog quantity is formed by "z" comparison quantities, which are realized by rigid division ratio circuits before the negative inputs of $2^{z-1}$ comparators.

The following decoder forms the digital output signal as a function of the switching levels of the seized comparators within a clock.

If a BZD Code can be used for the selected ADC, a BZD decoder similar to a type SN 74184 decoder, manufactured by Texas Instruments Inc., USA, can be employed if necessary.

Extensive detailing of these ADC circuits and of all units following hereinafter, e. g. calculator, memory register, translator and circuit agents, have been omitted since they are known to one skilled in the art. The coding selected partially determines the circuit arrangement.

The accuracy of the ADC is determined by its intended use. For an O.E.A. system, the speed of sampling rate of the selected ADC in relation to the slant range to present position or, respectively to, the pulse repetition frequency is of great importance.

Three parameters identify the accuracy of an ADC:
1. static error
2. conversion time Tu (dynamic error)
3. spurious signal noise suppression.

The static transfer characteristic of an ADC is shown in FIG. 1, Page EL 2 of the technical journal "Der Elektroniker" No. 2/1974. This characteristic shows a positive departure from the ideal transfer characteristic.

If, in a system, only ADC is used in which both the static transfer characteristics and the characteristics of the sum of all errors correspond, then said errors will cancel out during the division operation.

If, for example, in plane C the vectorial sum of amplitude is = 1 and in plane C also = 1 at the same time, then, if errorless ADC's are used, their digital output value would also be = 1.

The quotient 1/1 = 1 formed from the same can only be achieved with an ideal transfer characteristic. But if both the ADC's have the same positive deviated errors, e.g. 1%, then the real value of the quotient is equal to the ideal value of the quotient.

$$\frac{1.01}{1.01} = 1.00 \text{ (the quotient is errorless)}$$

Figure 6:
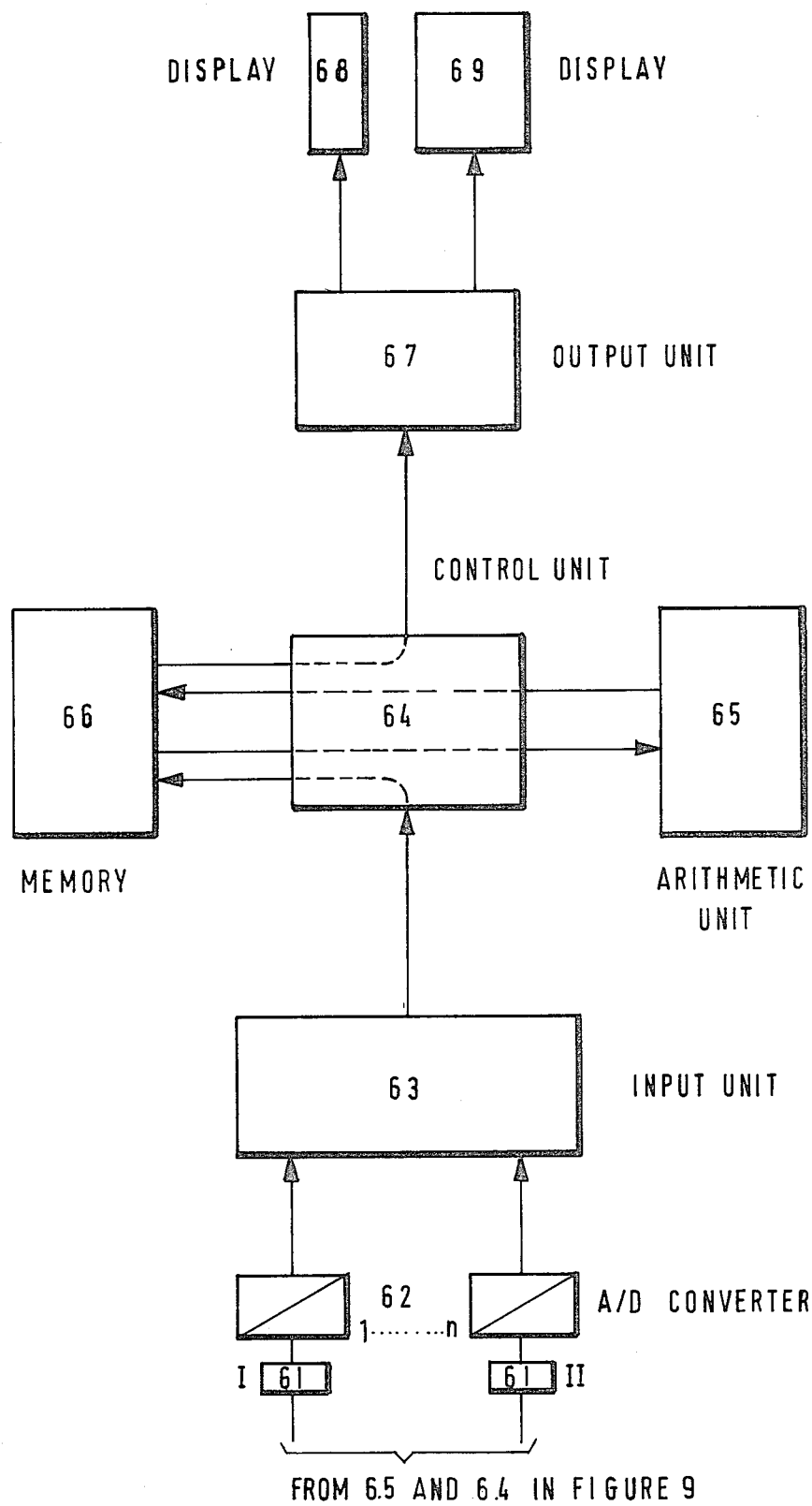
FIG. 6 depicts a generalized block diagram of an evaluation system according to the second evaluation method.

FIG. 6 shows a general calculator structure. For use in realization of this invention, the given structure is completely noncommitted, i. e. can be freely selected.

The output signals of the ADC 2 are supplied to the memory 6 via the input unit 3 and the control unit 4.

The control unit 4 transmits this data to the arithmetic unit 5 for the formation of quotients. 7 is the output unit and 8/9 form the display. Control is automatic with the clock of the incoming pulses. The required high speed of the calculator is dependent on the slant range to present position or, on the pulse repetition frequency.

FIG. 7 shows the calculation diagram (not identical to the wiring diagram). The outputs of the ADC 2 are connected to the comparator 3, whose outputs are transmitted to the following divider 4 so that the output signal formed only accepts the values $\leq 1$. The comparator 3a follows this divider 4 and compares the two adjacent quotients. The outputs of 3a are supplied to an electronic switch 5. This switch 5 connects the input with the greatest magnitude to the following comparator 3b. The outputs of 3b are allocated to the inputs of the electronic switch 5a. This switch 5a connects the largest of the two quotients allocated to the arithmetic units 6, 7, 8 and 9. These arithmetic units contain preset up counter and down counter.

In 6 the quotients are construed as cosine for the corresponding angle $\phi_E$ in the range $>0° \pm \frac{1}{2} \phi$. The angles calculated from the cosine in this range correspond to twice (double) the angle $\phi_E$. From $2\phi_E$, $\phi_E$ is calculated.

In 7 the quotients are also construed as cosine for the corresponding angle 0° 45° (when $n = 8$) or 30° (when $n = 12$).

In 7, the quotient is the cosine of the simple angle $\phi_E$.

In 8, the quotient (when $n = 8$) is construed as sine for angle $\phi_E > 45° + \frac{1}{2} \phi$, i. e. the quotient is here $> 0.7071 \ldots$ (Table 1).

In 9, the quotient is construed as cosine for the angle $\phi_E < 45° - \frac{1}{2} \phi$ if $n = 8$. (Table 2).

For an OEA with $n = 12$, quotients are construed as cosine in the arithmetic units (9).

Example: in 9

$$\phi_E = 60° - \phi_1 \text{ (from cos } \phi_1\text{)} \quad (1)$$

$$\phi_E = 120° - \phi_4 \text{ (from cos } \phi_4\text{)} \quad (2)$$

and as sine in 8 $\phi_E = \phi_2 - 30°$ (from sin $\phi_2$) (1)

$$\phi_E = \phi_3 - 30° \text{ (from sin } \phi_3\text{)} \quad (2)$$

For $\phi_E > 55°$, $n > 12$ must be selected if measurement is to be made pursuant to method 2.

The employment of method 2 in the monopulse system only requires the arithmetic unit or the counting device 6 for the calculation of $\phi_E$ in the limits zero degrees to $\pm\frac{1}{2}\phi$ or smaller than $\frac{1}{2}\phi$. The quotient is here the cosine. Stage $\frac{1}{2}\phi$ is removed (but not when used in a OER).

Method 3

FIG. 9 shows the corresponding calculation diagram (not identical to the wiring diagram) used for the azimuth evaluation after quotient processing. Memory registers and other components are omitted for clarity.

The outputs of the summing circuits or comparators 6.4 of FIG. 14 are connected to the S+H circuit 1 of the ADC 2. Only one output — e.g. the second output — must be routed via the phase shifter Y to provide the phase compensation, so that the divider 96 receives inphase signals from 2. The outputs of 2 are routed to the inputs of the exclusive-OR circuit 93 as well as to the comparator 94. The following translater 95 connects these signals in a suitable way to the inputs of the quotienter or divider 96 so that only quotients equal to or less than 1 are formed.

The arithmetic unit 97 construes these quotients as the value $\cos 2 \Delta\phi'$. From this quotient, $2 \Delta\phi'$ and subsequently $\Delta\phi'$ are determined. The last stage of 97 calculates $\Delta\phi$. FIG. 9a defines the expression $\Delta\phi'$.

The output of 93 is only low if both inputs of 93 have low or high signals simultaneously. The following gate 913, upon receiving a low input, provides the command for the calculating operation for $\frac{1}{2}\phi$. If there is equivalence, then 96 forms the quotient $1.0000 = \cos 2.0 = \cos 0°$. With this result, the calculating operation is blocked in arithmetic unit 97.

In this case, the OR circuit 15 only provides the summing (8) circuit with the value of $\frac{1}{2}\phi$.

The phase 0 is the reference phase for the phase meter 910, (e.g. A Wide Range Phase Meter and Voltage Comparator, Type 734 manufactured by FAIRCHILD). The outputs of 910 are assigned to the arithmetic unit 911. In 911 the value $n \cdot \phi$ is formed (only integral multiples of). This value is formed in the coder 912 for the selected code. The summing circuit 98 adds the values $n \cdot \phi + \Delta\phi$ or $n \cdot \phi + \frac{1}{2}\phi$.

For example, the display 99 can consist of a decoder with connected digital display to portray the angle $\phi_A$ in figures.

Figure 8:
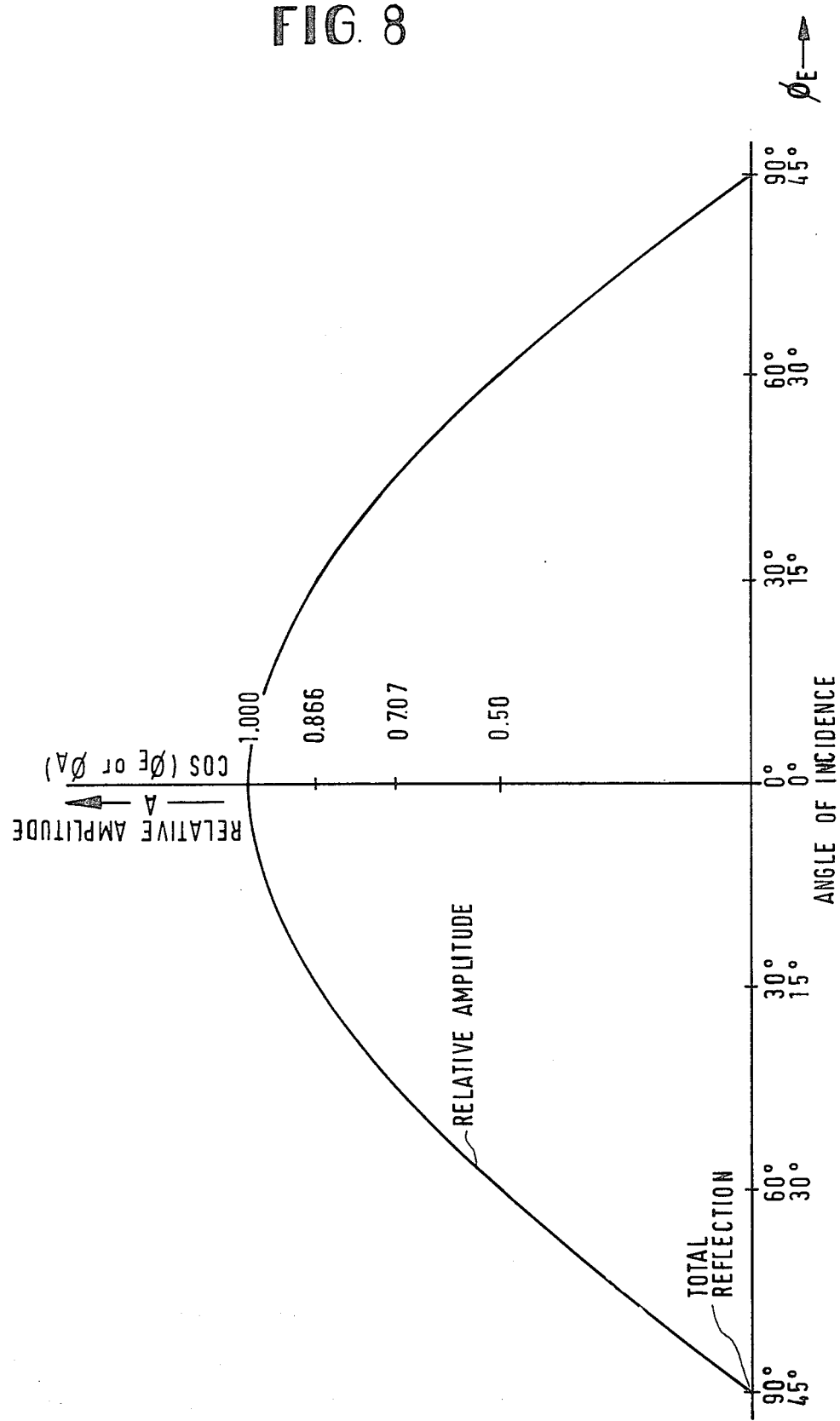
FIG. 8 illustrates the dependence of the relative amplitude on the angle of incidence of the optical arrival angle.

FIG. 8 shows the dependence of the amplitude on the optical arrival angle. At an arrival angle of 45°, all beams are already totally reflected.

If the arrival angle is 0°, then the transmitted intensity — or respective amplitude — has the value 1.000. The shape of this function is cosinusoidal. The cosine of 2·45° = cos 90° is zero and corresponds analogically to the value of the amplitude attained under these conditions. The cosine for zero degrees is 1.000. The cos 2.0° is also = 1.000.

But if the arrival angle is equal to a section angle, (e.g. 0° or 30° or 45° etc.), then the spherical associative characteristics described earlier apply.

The following examples and tables provide a clearer definition of the spherical associative characteristics used in the invention.

Spherical associative characteristics

Mathematical Rule $A_c/A_{-c} = 1 = \cos 0°$ (for $\phi_E = 0°$)

Hypothesis

For $\phi_E = 0° + \Delta\phi$ the quotient is $$\frac{(A_c - A'_c) \cos \Delta\phi}{(A_{-c} + A'_{-c}) \frac{1}{\cos \Delta\phi}} = \cos 2\Delta\phi$$

EXAMPLE 1

$A'_{-c} \approx A'_c \approx 0.01$ for $\Delta\phi = 7.5°$ $$\cos 2 \Delta\phi = \frac{(1 - 0.01) \cdot 0.9914}{1 + 0.01 \cdot \frac{1}{0.9914}} = 0.965$$

$\cos 2 \Delta\phi = 0.965$
$2 \Delta\phi = 15°$
$\Delta\phi = 7.5° = \phi_E$

EXAMPLE 2

The growth of $A_c$ is smaller than the drop of $A_{-c}$ if the deviation $\phi$ assumes larger values.

Let $\phi = 15°$:
$A_c \approx 0.03$
$A'_{-c} \approx 0.06$

Then:

$$\cos 2 \Delta\phi = \frac{(1 - 0.06) \cos 15°}{(1 + 0.03) \frac{1}{\cos 15°}} = 0.86 \approx 0.866$$

$2 \Delta\phi = 30° = 2 \phi_E$ $\Delta\phi = 15° = \phi_E$

TABLE 1
(for n = 12)

| $\phi_E$ degree | Spherical associative characteristics Quotient ($\cos \phi_E$) | Hypothesis Presumably practicable determining of $\phi_E$ by deviation | |
|---|---|---|---|
| | | $+\Delta\phi$ (max. $\frac{\phi}{2}$)⁻ | $-\Delta\phi$ (max. $-\frac{\phi}{2}$) |
| | | Arithmetic Unit 6 in FIG. 7 | |
| 0° | $\frac{F_c}{F_{-c}} \triangleq \frac{A_c}{A_{-c}}$ where $F$ is surface and $A$ is amplitude | Quotient $\triangleq \cos 2\phi_E$ $\phi_E \triangleq \frac{1}{2} 2\phi_E$ | Quotient $\triangleq \cos 2(-)\phi_E$ $-\phi_E \triangleq \frac{1}{2} (-) 2\phi_E$ |
| 15° | $\frac{F_b}{F_{-c}} \triangleq \frac{A_b}{A_{-c}}$ | | |
| | | Arithmetic Unit 9 in FIG. 7 | |
| 30° | $\frac{F_b}{F_c} \triangleq \frac{A_b}{A_c}$ | Quotient $\triangleq \cos \phi_1$ $\phi_E \triangleq 60° - \phi_1$ | |
| | | Arithmetic Unit 8 in FIG. 7 | |
| | | Quotient $\triangleq \sin \phi_2$ $\phi_E \triangleq \phi_2 - 30°$ | Quotient $\triangleq \sin \phi_3$ $\phi_E \triangleq \phi_3 - 30°$ |
| 60° | $\frac{F_a}{F_b} \triangleq \frac{A_a}{A_b}$ | | Arithmetic Unit 9 in FIG. 7 |
| | | Quotient $\triangleq \cos \phi_4$ $\phi_E \triangleq 120° - \phi_4$ | |

TABLE 2
(for n = 8)

| | | | | |
|---|---|---|---|---|
| 0° | $\frac{F_{II}}{F_{-II}} \triangleq \frac{A_{II}}{A_{-II}}$ where F is surface and A is amplitude | Quotient $\triangleq \cos 2\phi_E$ $\phi_E \triangleq \frac{1}{2} 2\phi_E$ when $\phi_E > 0° \to \frac{\phi}{2}$ | Quotient $\triangleq \cos 2(-)\phi_E$ $-\phi_E \triangleq \frac{1}{2}(-)2\phi_E$ when $\phi_E < 0° \to -\frac{\phi}{2}$ | |
| 45° | $\frac{F_I}{F_{II}} \triangleq \frac{A_I}{A_{II}}$ | Quotient $\triangleq \sin \phi_E$ when $\phi_E > 45° \to \frac{\phi}{2}$ | Quotient $\triangleq \cos \phi_E$ when $\phi_E < 45° \to -\frac{\phi}{2}$ | |

Tables 1 and 2, and FIG. 15, contain the spherical associative characteristics and the derivative hypotheses.

Table 1 (for $n = 12$)

If $\phi_E = 0°$, i.e. if the received beam strikes the spherical surface horizontally, then the surface $F_c = $ surface $F_{-c}$, and analogously the amplitude $A_c = $ amplitude $A_{-c}$.

The quotient thus formed is $$\frac{A_c}{A_{-c}} = \frac{1.000}{1.000} = 1 = \cos \phi_E$$
$$\phi_E = 0°$$

At this amplitude ratio, one can immediately calculate the correct angle $\phi_E$ from the quotients!

This also applies analogously to the angles $\phi_E = 30°$ or 60°.

Angles $\phi_E$ lying between the two above figures must be calculated in a different way.

If the received signal deviates from $\phi_E = 0°$, e.g. is $+\phi/2$, then amplitude $A_c$ becomes a maximum and amplitude $A_{-c}$ becomes much smaller than at $\phi_E = 0°$. The beam falls vertically on to the surface $F_c$!

The quotients are within the range $\pm \Delta \phi = \pm \Delta \phi/2$, thus cos 2 $\Delta \phi$ or cos 2 $\phi_E$ and always have the value < 1.000. 2 $\phi_E$ is calculated from this quotient and then $\phi_E$. Thus the formula $\phi_E = \frac{1}{2} \cdot 2 \cdot \phi_E = \phi_E$.

For $\phi_E < 30°$, the cos $< 0.866$ applies, e.g. $\phi_E = 28° = \phi_3$.

However, the quotient $A_b/A_c$ becomes 0.866, thus the sine is interpreted:

$$\text{e.g.} \quad \frac{A_b}{A_c} = 0.848 = \sin \phi_3$$
$$\text{calculate} \to \phi_E = \phi_3 - 30° = 58° - 30° = 28°$$

For positive deviation from $\phi_E > 30°$ (up to max 30° + $\phi/2$), $\phi_E$ 60° $- \phi_1$ applies; the quotient calculated from the amplitude ratio is here cos $\phi_1$.

If the quotient is construed as sine $\phi_2$ (also possible), then $\phi_E = \phi_2 - 30°$ applies.

The angles for these deviations are entered in the arithmetic units 6, 7, 8 of FIG. 7.

The same consideration applies to Table 2.

At 45° $\phi_E$, the cosine = sine = 0.707.

For $+ \Delta \phi$, the amplitude $A_I$ becomes larger and $A_{II}$ smaller.

But the quotient $A_I/A_{II}$ becomes larger. The relationship corresponds to the sine. Thus sine $\phi_E$.

At $\phi_E < 45°$, the cosine applies, because the quotient becomes smaller. Thus cos $\phi_E$.

Design of optical antennas

Figure 10:
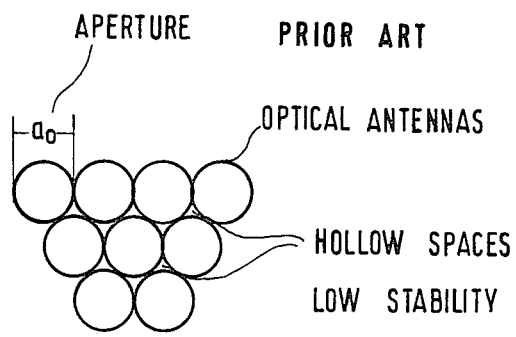
FIG. 10 shows a surface composed of circular apertures.
Figure 10A:
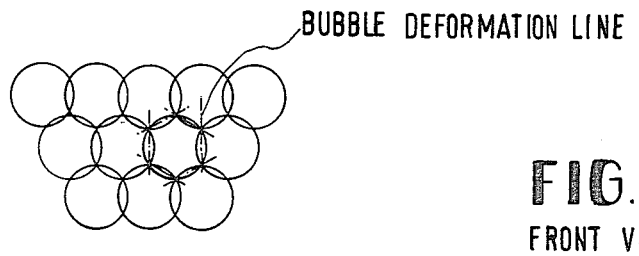
FIG. 10a shows the transitional phase of FIG. 10 into FIG. 10b.
Figure 10C:
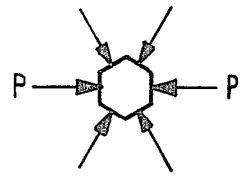
FIG. 10c shows a front view of an individual antenna element.
Figure 10B:
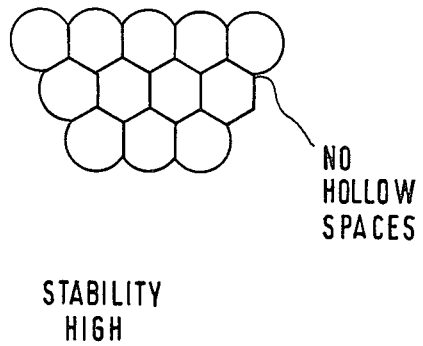
FIG. 10b shows an embodiment of the antenna according to the invention.

The optical antenna configuration is shown in FIGS. 10b and 10c. Circular antennas or lenses are generally know.

Here this circular configuration is replaced by a hexagonal configuration.

The hexagonal configuration can be realized:

(1.) by compacting pressure in accordance with the already familiar improved method of the English Mullard Research Laboratories, Redhill, England (which constitute part of international Philips Research), (2.) by using an elastic lens of synthetic material filled with inert gas, which develop this hexagonal configuration under the polydimensional pressure (P) exerted on a considerable quantity of such lenses or optical antennas.

The optical efficacy of such lenses is confirmed by the configuration of the eye facets of the Hornet Rioter butterfly. Color photos of these facets are shown in "Bild der Wissenschaft", Journal of Natural Sciences and Technology, Edition 11, Page 1284 of Nov. 1973.

The advantage of this design is clearly the magnifying of the effective spherical surface.

A separate circular bubble of synthetic material or lens takes on the configuration of an equilateral hexagon under constant polydimensional pressure from six separate and individual neighboring bubbles of synthetic material, and an oval or elliptical separate and individual bubble of synthetic material takes on under the same conditions a scalene hexagonal form (as in the eye facets of a wasp).

The present invention therefore entails taking a large number of separate and individual bubbles which are transparent to the operating frequency of the lens or antenna and filling the bubbles with either a liquid or gas also transparent at the frequency of operation. The bubbles are then compressed together to form the hexagonal shapes shown in FIG. 10c. The resulting antenna has an improved stability and increased surface area over other optical antennas arranged on a spherical shape.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An optical antenna or lens comprising a plurality of separate and individual bubbles filled with a material transparent to the optical frequency to be utilized for the antenna or lens, at least the separate and individual bubbles surrounded by other bubbles in contacting relation therewith having a hexagonal shape in at least one plane.

2. An optical antenna or lens according to claim 1, wherein said filling material of each of said bubbles is one of a refracting liquid and a gas.

3. An optical antenna or lens according to claim 1, wherein said plurality of separate and individual bubbles comprises closed separate and individual elastic bubbles.

4. An optical antenna or lens according to claim 1, wherein said filling material of each of said bubbles is a gas.

5. A method for the evaluation of the information received from an opto-electronic antenna system having a plurality of stationary antennas disposed on a prescribed geometrical surface, the optical axis of each antenna having an elevation and azimuth and being disposed at a solid angle with respect to the optical axes of the other antennas and intercepting a single base point comprising the steps of:

obtaining voltage components from a plurality of detectors connected to selected ones of the plurality of antennas;

modifying the phase of the obtained voltage components by the neighboring solid angle components in elevation and azimuth;

forming a resultant quotient from the modified voltage components; and calculating accurate information of the direction of the solid angle associated with the information received in elevation and azimuth on the basis of the resultant quotient.

6. A method for the evaluation of the information received from an opto-electronic antenna system having a plurality of stationary antennas disposed on a prescribed geometrical surface, the optical axis of each antenna having an elevation and azimuth and being disposed at a solid angle with respect to the optical axes of the other antennas and intercepting a single base point comprising the steps of:

obtaining voltage components from a plurality of detectors connected to selected ones of the plurality of antennas;

modifying the phase of at least selected voltage components by the neighboring solid angle components;

forming the quotients of the voltages of said neighboring components, wherein the quotients are numerically less than or equal to one; and calculating the directional information associated with a received signal on the basis of the formed quotients.

7. In an antenna system having a plurality of stationary antennas disposed on a prescribed geometrical surface, the optical axis of each antenna having an elevation and azimuth and being disposed at a solid angle with respect to the optical axes of the other antennas and intercepting a single base point, apparatus for evaluating information received from the antenna system comprising:

means for obtaining voltage components from a plurality of detectors connected to selected ones of the plurality of antennas, means for modifying the phase of the obtained voltage components by the neighboring solid angle components in elevation and azimuth;

means for adding at least selected modified and unmodified voltage components by vector addition to form a resultant output; and means responsive to the resultant output for calculating accurate information for one of a vertical angle and a horizontal angle associated with the information received.

8. An antenna system according to claim 7, wherein said antennas are optical antennas comprising a plurality of bubbles filled with a material transparent to the optical frequency utilized for the antenna, at least the bubbles surrounded by other bubbles in contacting relation therewith having a hexagonal shape in at least one plane.

9. An antenna system according to claim 8, wherein said filling material of said bubbles is one of a refracting liquid and a gas.

10. An optical antenna or lens according to claim 8, wherein said plurality of bubbles comprises closed elastic bubbles.

11. An optical antenna or lens according to claim 8, wherein said filling material of said bubbles is a gas.

12. In an antenna system having a plurality of stationary antennas disposed on a prescribed geometrical surface, the optical axis of each antenna having an elevation and azimuth and being disposed at a solid angle with respect to the optical axes of the other antennas and intercepting a single base point, apparatus for evaluating information received from the antenna system comprising:

means for obtaining voltage components from a plurality of detectors connected to selected ones of the plurality of antennas;

means for modifying the phase of at least selected voltage components by the neighboring solid angle components;

means for forming, the quotients of said voltages of said neighboring components, wherein said quotients are numerically less than or equal to one; and means responsive to the formed quotients for calculating directional information associated with a received signal.

13. An antenna system according to claim 12, wherein said antennas are optical antennas comprising a plurality of bubbles filled with a material transparent to the optical frequency utilized for the antenna, at least the bubbles surrounded by other bubbles in contacting relation therewith having a hexagonal shape in at least one plane.

14. An antenna system according to claim 13, wherein said filling material of said bubbles is one of a refracting liquid and a gas.

15. An optical antenna or lens according to claim 13, wherein said plurality of bubbles comprises closed elastic bubbles.

16. An optical antenna or lens according to claim 13, wherein said filling material of said bubbles is a gas.

* * * * *